United States Patent [19] [11] 4,264,529
Dunn [45] Apr. 28, 1981

[54] METHOD FOR PREPARING P-AMINOPHENOL

[75] Inventor: Thomas J. Dunn, Cedar Hill, Mo.

[73] Assignee: Mallinckrodt, Inc., St. Louis, Mo.

[21] Appl. No.: 133,084

[22] Filed: Mar. 24, 1980

[51] Int. Cl.³ .................... C07C 85/11; C07C 89/00
[52] U.S. Cl. .................................. 564/418; 260/689
[58] Field of Search ................ 260/575, 580, 689; 252/466 PT, 466 B

[56] References Cited

U.S. PATENT DOCUMENTS

| | | | |
|---|---|---|---|
| 3,265,735 | 8/1966 | Bradbury | 260/575 |
| 3,383,416 | 5/1968 | Benner | 260/575 |
| 4,164,481 | 8/1979 | Ma | 260/575 X |

Primary Examiner—John Doll
Attorney, Agent, or Firm—Grace J. Fishel; Lynden N. Goodwin; Roy J. Klostermann

[57] ABSTRACT

This invention relates to the field of organic chemistry, and more particularly, to a method for the preparation of p-aminophenol.

10 Claims, No Drawings

METHOD FOR PREPARING P-AMINOPHENOL p-Aminophenol (PAP) is an important chemical intermediate used in the preparation of the analgesic, acetaminophen (APAP). A number of other derivatives having a wide variety of industrial applications may also be prepared from PAP.

An important commercial method for the preparation of PAP involves the catalytic hydrogenation of nitrobenzene in an acid aqueous medium. Conventionally, the hydrogenation is carried out in the presence of a 10%–13% sulfuric acid solution containing a small amount of a surfactant, such as dodecyltrimethylammonium chloride, and utilizing a platinum-on-carbon catalyst. The reaction is complex and yields, in addition to the principal product, PAP, a significant amount of aniline and smaller amounts of other impurities.

In any commercial process which utilizes a platinum catalyst, recovery of the platinum from the spent catalyst is an important economic factor. While the carbon-supported platinum catalysts commonly used in the nitrobenzene/PAP process are reasonably satisfactory from the point of view of their primary function, i.e., the conversion of nitrobenzene to PAP, they leave much to be desired from the point of view of platinum recovery from the spent catalyst. As a rule, such recovery depends on combustion of the carbon to separate it from the platinum. Experience has shown such recovery to be only about 60–65% efficient. In addition, the spent carbonaceous catalyst is rather unpleasant to handle.

In accordance with the above, it is an object of this invention to provide a method for the preparation of PAP from nitrobenzene utilizing a supported platinum catalyst having performance characteristics essentially equivalent to those of a good platinum-on-carbon catalyst but which is adapted to the recovery of platinum in high yield therefrom. Other objects and features will be in part apparent and in part pointed out hereinafter.

The present invention is directed to a method for preparing p-aminophenol which comprises hydrogenating nitrobenzene in an acidic aqueous reaction medium in the presence of a catalyst comprising platinum supported on gamma-alumina.

The term "alumina" covers a considerable variety of specific entities having varying physico-chemical properties. The chemical compositions of various types of alumina run from trihydrates, $Al(OH)_3$, through monohydrates, $AlOOH$, to the anhydrous oxide, $Al_2O_3$. The matter is further complicated by the existence of different crystalline forms having essentially the same gross chemical composition. Further, in addition to the three more or less well defined degrees of hydration suggested by the chemical formulas given above, there exist a number of "transition aluminas", identifiable by crystallographic and other physico-chemical criteria. The matter is still further complicated by the intermingling of two or more systems of nomenclature. To illustrate, one crystalline entity having the nominal composition of $Al(OH)_3$ is known variously as alpha-alumina trihydrate, gibbsite and hydrargyllite. Similarly, one crystalline entity having the nominal composition represented by $AlOOH$ is known as alpha-alumina oxide hydroxide, alpha-alumina monohydrate or boehmite. The end product of the thermal degradation of all the forms of hydrated alumina is $Al_2O_3$, known as alpha-alumina or corundum. The term "activated alumina" has been applied broadly to the transition aluminas. The whole matter of the interrelationships of the various types of "alumina" is discussed in the Kirk-Othmer "Enclyclopedia of Chemical Technology", 3rd Ed. Vol. 2, pp. 218–244 (John Wiley & Sons, New York) 1978, which is incorporated herein by reference.

Alumina-supported platinum catalysts have been used in such large scale applications as oxidation catalysts in automobile mufflers and as dehydrogenation/hydrogenation catalysts in gasoline reforming. However, only a few general references have been made to the use of such catalysts in processes involving the hydrogenation of nitrobenzene. For example, U.S. Pat. No. 3,715,397 suggests that platinum supported on alpha-alumina may be a useful catalyst in the hydrogenation of nitrobenzene to PAP in an aqueous sulfuric acid reaction medium. Similarly, U.S. Pat. No. 3,694,509 suggests that a catalyst consisting of platinum supported on alumina is useful in the catalytic hydrogenation of nitrobenzene to phenylhydroxylamine in a neutral aqueous/alcoholic medium. U.S. Pat. No. 3,472,897 suggests the use of a catalyst consisting of platinum supported on pure eta-alumina in the preparation of aniline by the hydrogenation of nitrobenzene in glacial acetic acid. Similarly, U.S. Pat. No. 3,253,039 suggests the use of a catalyst consisting of platinum supported on activated alumina in the same reaction.

N. M. Popova, et al. (Chem. Abs. 72: 104294b/1970) used a catalyst consisting of mixed platinum and palladium supported on aluminum oxide in the hydrogenation of nitrobenzene in water or ethanol.

In accordance with the present invention, the hydrogenation of nitrobenzene to PAP in an acidic aqueous medium is carried out utilizing a supported platinum catalyst in which the support is the transition alumina known as gamma-alumina. Gamma-alumina is the first transition phase encountered in the calcination of boehmite (alpha-alumina monohydrate) to alpha-alumina (corundum). It is formed by calcining boehmite at temperatures in the range of 500°–850° C. Preferably, the gamma-alumina support has a specific surface area of at least 200 $m^2/g$. Preferably, the supported catalyst should contain about 3–5% Pt. However, such catalysts containing Pt in the range of about 1–10% may be used.

Platinum is readily recoverable from spent Pt/gamma-alumina catalysts by immersing the spent catalyst in a strongly alkaline solution, such as a solution of sodium hydroxide, to dissolve the gamma-alumina. The undissolved platinum may then be filtered off. Recovery yields of about 80–85% are ordinarily achievable. Alpha-alumina is not readily soluble under the same conditions.

The invention is further illustrated by the following example.

EXAMPLE

I.

Supported platinum catalysts were prepared using as supports alpha-alumina and gamma-alumina. The gamma-alumina was prepared by calcining boehmite powder (48% less than 45 microns, 9% larger than 90 microns) at 1100° F. (593° C.) for two hours. The cooled product was screened through a U.S. Standard No. 325 sieve.

The characteristics of this gamma-alumina and of the alpha-alumina also used as a support are set forth in Table 1.

TABLE 1

| Characteristic | Characteristics of Alumina Supports | |
| --- | --- | --- |
|  | Alpha-Alumina | Gamma-Alumina |
| Specific surface area (m²/g)(BET) | 5.7 | 230 |
| Bulk Density (g/cc) | 0.83 | 0.62 |
| Loss on Ignition (%) | 0.16 | 7.77 |
| Iron (Fe)(%) | 0.001 | 0.003 |
| Sulfur (S)(%) | 0.007 | 0.009 |
| Filter Speed (sec) | 143 | 191 |
| Proportion Passing U.S. No. 325 Sieve | All | All |
| Ave. Particle Size (microns) | 23 | 23 |

II.

Platinum was deposited on the alpha- and gamma-alumina supports by the following method.

A portion of the alumina (48.5 g) was slurried in water (500 ml) at 22° C. Chloroplatinic acid solution (100 ml. containing 1.5 g Pt) was added dropwise to the stirred slurry during a period of 10 minutes. The slurry was stirred an additional 10 minutes, then vacuum filtered. Without washing, the filter cake was dried 16 hours at 150° C.

III.

The platinum deposit was reduced to metallic platinum as follows. The dry platinum/alumina composition was packed into a quartz tube (1" diameter) and the tube was purged with hydrogen (100 ml/min.) for 10 minutes. Hydrogen (100 ml/min) was then passed through the tube at 350° C. for 30 minutes. The catalyst was cooled under hydrogen, then the tube was purged with nitrogen (100 ml/min) for 10 minutes, and the catalyst was discharged from the tube under nitrogen.

A second batch of Pt/gamma-alumina catalyst (B) was prepared by the procedure described above for the first batch (A).

The supported catalysts had the characteristics tabulated in Table 2.

TABLE 2

| Characteristic | Characteristics of Supported Catalysts | | |
| --- | --- | --- | --- |
|  | Support | | |
|  | Alpha-Alumina | Gamma-Alumina A | B |
| Pt. (% w/w) | 2.93 | 2.88 | 2.88 |
| Pt. Dispersion (%) | 10.5 | 53.1 | 36.4 |
| Specific Surface Area (m²/g) | 7 | 229 | 229 |
| Iron (Fe)(%) | 0.004 | 0.008 | −0.008 |
| Mean particle diameter (microns) | 25 | 32 | −32 |
| Loss on Ignition (%) | 0.33 | 2.71 | 7.01 |

IV.

The catalysts described above were used in the catalytic hydrogenation of nitrobenzene to PAP by the method described below, the hydrogenation being interrupted prior to the consumption of all the nitrobenzene, as described by R. G. Benner (U.S. Pat. No. 3,383,416).

A mixture of distilled water (650 ml), dodecyltrimethylammonium chloride, (2 ml) and Pt/alumina catalyst containing 7.5 mg of Pt, in a 2 liter reaction vessel equipped for pressure hydrogenation, was flushed with nitrogen, then heated to 70° C. under hydrogen. With vigorous agitation, sulfuric acid (80 g of 95-98% reagent grade/Sp.Gr. 1.84) was added during a period of 2-3 minutes, the temperature rising to 87°-88° C. Nitrobenzene (108 g) was added rapidly, and hydrogenation was carried out at 87°-90° C. at pressures slightly above atmospheric (6-10 inches of water). After 5-6 hours the hydrogenation was interrupted and the aqueous and nitrobenzene phases were separated, the catalyst remaining suspended in the nitrobenzene phase. The concentrations of p-aminophenol and aniline, respectively, in the aqueous phase were determined by high pressure liquid chromatography. Significant data are tabulated in Table 3.

TABLE 3

| Reaction Products of Catalytic Hydrogenation of Nitrobenzene | | | |
| --- | --- | --- | --- |
| Catalyst | Run No. | Hydrogenation Time (hrs.) | Product Concentration in Aqueous Phase (mg/ml) |
|  |  |  | PAP | Aniline |
| Pt/alpha-alumina | 1 | 6 | 15.9 | 2.3 |
| " | 2 | 5.25 | 6.6 | 1.1 |
| Pt/gamma-alumina (B) | 3 | 6 | 85.3 | 24.3 |
| Pt/gamma-alumina (B) | 4 | 5 | 82.0 | 25.0 |
| Pt/C* | 5 | 6 | 81.0 | 16.0 |
| 41 | 6 | 6 | 81.5 | 14.7 |

*Runs 5-6 utilized, for comparison a platinum-on-carbon catalyst that had shown good performance in the commercial production of PAP from nitrobenzene.

Experience has shown that the performance of a catalyst, as evaluated by the method outlined above, may be considered acceptable if the yield of PAP exceeds 50 mg/ml and the PAP/aniline ratio is greater than 3.0.

In view of the above, it will be seen that the objects of the invention are achieved and other advantageous results obtained.

As various changes could be made in the above methods without departing from the scope of the invention, it is intended that all matter contained in the above description shall be interpreted as illustrative and not in a limiting sense.

What is claimed:

1. A method for preparing p-aminophenol which comprises hydrogenating nitrobenzene in an acidic aqueous reaction medium in the presence of a catalyst comprising platinum supported on gamma-alumina.

2. A method as defined by claim 1 wherein the catalyst is prepared by a method which comprises depositing platinum on a support prepared by calcining boehmite at a temperature in the range of 500° C. to 850° C.

3. A method as defined by claim 2 wherein the boehmite is calcined at a temperature of about 593° C.

4. A method as defined by claim 2 wherein the catalyst support has a specific surface area of at least 200 m²/g.

5. A method as defined by claim 4 wherein the support has a specific surface area of about 230 m²/g.

6. A method as defined by claim 4 wherein the catalyst contains about 1-10% Pt.

7. A method as defined by claim 6 wherein the catalyst contains about 3-5% Pt.

8. A method as defined by claim 1 wherein the catalyst contains about 3% Pt.

9. A method as defined by claim 1 wherein the hydrogenation is interrupted prior to the consumption of all the nitrobenzene.

10. In a method for the preparation of p-aminophenol by the catalytic hydrogenation of nitrobenzene in an acidic aqueous reaction medium, the improvement which comprises utilizing a catalyst comprising platinum supported on gamma-alumina.

* * * * *